(12) United States Patent
Yen et al.

(10) Patent No.: US 11,502,599 B2
(45) Date of Patent: Nov. 15, 2022

(54) CONSTANT GATE-TO-SOURCE-VOLTAGE-DRIVING DRIVER ARCHITECTURE FOR SWITCHED-MODE POWER SUPPLIES

(71) Applicant: QUALCOMM Incorporated, San Diego, CA (US)

(72) Inventors: Ta-Tung Yen, San Jose, CA (US); Chunping Song, Palo Alto, CA (US); Guoyong Guo, San Jose, CA (US); Hector Ivan Oporta, San Jose, CA (US); Ahmed Abdelmoaty, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 17/021,614

(22) Filed: Sep. 15, 2020

(65) Prior Publication Data

US 2021/0083573 A1 Mar. 18, 2021

Related U.S. Application Data

(60) Provisional application No. 62/902,170, filed on Sep. 18, 2019.

(51) Int. Cl.
*H02M 3/07* (2006.01)
*H02M 1/08* (2006.01)
*H02J 7/00* (2006.01)

(52) U.S. Cl.
CPC .............. *H02M 3/073* (2013.01); *H02J 7/007* (2013.01); *H02M 1/08* (2013.01); *H02J 2207/20* (2020.01)

(58) Field of Classification Search
CPC .......... H02M 3/07; H02M 3/073; H02M 1/08; H02J 7/00; H02J 7/007; H02J 2207/20
USPC ......................................................... 320/140
See application file for complete search history.

(56) References Cited

U.S. PATENT DOCUMENTS

| 6,559,689 | B1 * | 5/2003 | Clark | ................... | H03K 17/063 |
|           |      |        |       |                    | 327/91 |
| 2012/0064952 | A1 * | 3/2012 | Iijima | ................ | H03K 17/6221 |
|           |      |        |       |                    | 455/571 |
| 2012/0212293 | A1 * | 8/2012 | Khlat | ....................... | H03F 3/24 |
|           |      |        |       |                    | 330/127 |
| 2012/0313701 | A1 * | 12/2012 | Khlat | ..................... | H02M 3/07 |
|           |      |        |       |                    | 330/127 |

(Continued)

*Primary Examiner* — Richard Isla
*Assistant Examiner* — Dung V Bui
(74) *Attorney, Agent, or Firm* — Patterson+ Sheridan, L.L.P.

(57) ABSTRACT

Techniques and apparatus for supplying power to gate drivers of a switched-mode power supply (SMPS) circuit. One example power supply circuit generally includes a SMPS circuit having a first input voltage node and a second input voltage node, and a charge pump. The charge pump generally includes a first capacitive element having a first terminal and a second terminal; a first switch coupled between a first input node of the charge pump and the first terminal of the first capacitive element; a second switch coupled between the second terminal of the first capacitive element and a second input node of the charge pump; a third switch coupled between the first terminal of the first capacitive element and the first input voltage node of the SMPS circuit; and a fourth switch coupled between the second terminal of the first capacitive element and the second input voltage node of the SMPS circuit.

30 Claims, 5 Drawing Sheets

(56) References Cited

U.S. PATENT DOCUMENTS

2014/0062590 A1\* 3/2014 Khlat ................... H03F 1/0227
330/127
2018/0006552 A1\* 1/2018 Delos Ayllon ........ H02M 1/088
2019/0167989 A1\* 6/2019 Guyon ............... A61N 1/37288

\* cited by examiner

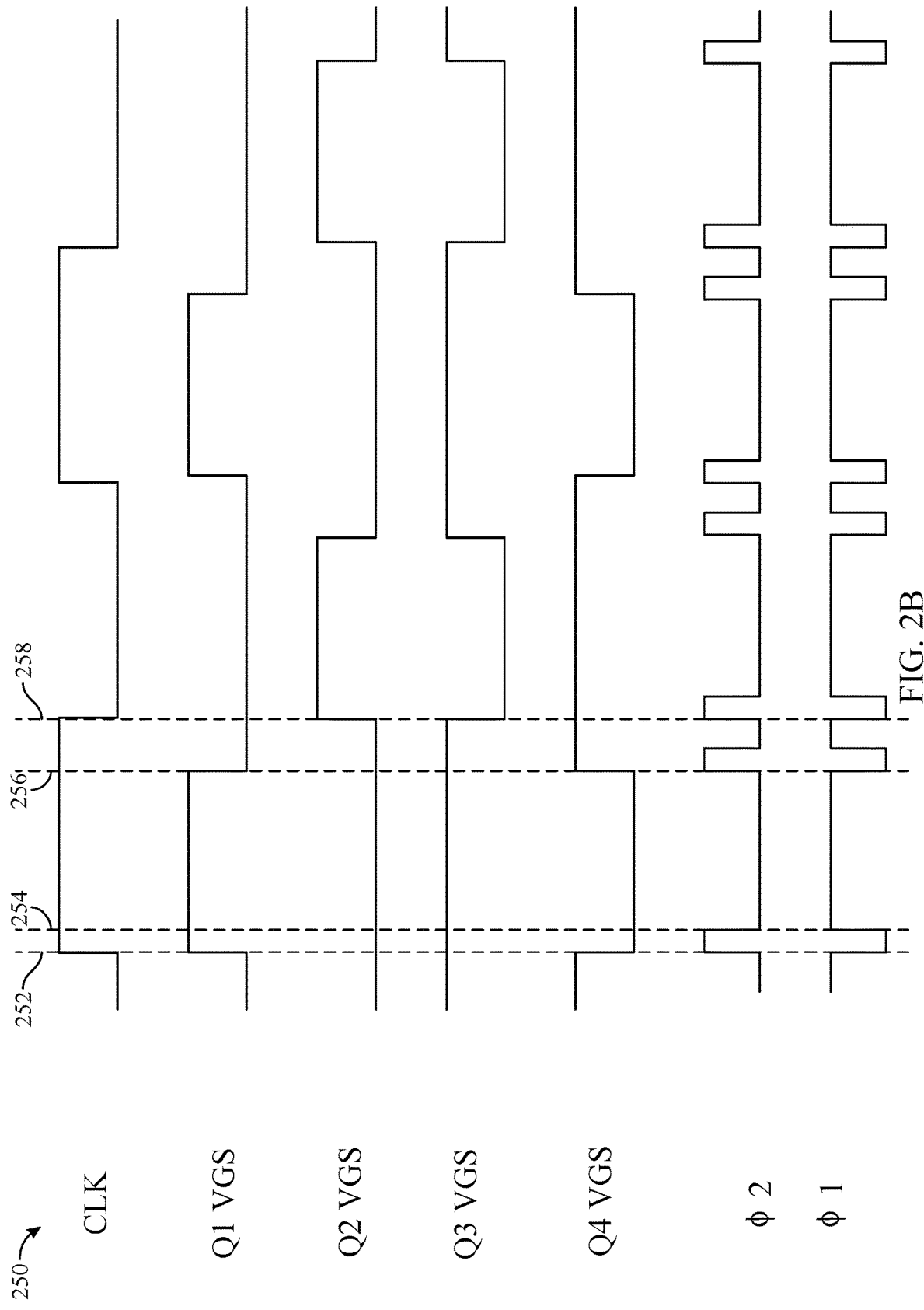

CONSTANT GATE-TO-SOURCE-VOLTAGE-DRIVING DRIVER ARCHITECTURE FOR SWITCHED-MODE POWER SUPPLIES

CROSS-REFERENCE TO RELATED APPLICATION(S)

This application claims the benefit of priority to U.S. Provisional Application No. 62/902,170, filed Sep. 18, 2019 and entitled "Constant Gate-to-Source-Voltage-Driving Driver Architecture for Switched-Mode Power Supplies," which is expressly incorporated by reference in its entirety as if fully set forth below and for all applicable purposes.

TECHNICAL FIELD

Certain aspects of the present disclosure generally relate to electronic circuits and, more particularly, to a driver architecture for switched-mode power supplies.

BACKGROUND

A voltage regulator provides a constant direct current (DC) output voltage regardless of changes in load current or input voltage. Voltage regulators may be classified as either linear regulators or switching regulators. While linear regulators tend to be small and compact, many applications may benefit from the increased efficiency of a switching regulator. A linear regulator may be implemented by a low-dropout (LDO) regulator, for example. A switching regulator may be implemented by a switched-mode power supply (SMPS), such as a buck converter, a boost converter, a buck-boost converter, or a charge pump.

For example, a buck converter is a type of SMPS typically comprising: (1) a high-side switch coupled between a relatively higher voltage rail and a switching node, (2) a low-side switch coupled between the switching node and a relatively lower voltage rail, (3) and an inductor coupled between the switching node and a load (e.g., represented by a shunt capacitive element). The high-side and low-side switches are typically implemented with transistors, although the low-side switch may alternatively be implemented with a diode.

A charge pump is a type of SMPS typically comprising at least one switching device to control the connection of a supply voltage across a load through a capacitor. In a voltage doubler, for example, the capacitor of the charge pump circuit may initially be connected across the supply, charging the capacitor to the supply voltage. The charge pump circuit may then be reconfigured to connect the capacitor in series with the supply and the load, doubling the voltage across the load. This two-stage cycle is repeated at the switching frequency for the charge pump. Charge pumps may be used to multiply or divide voltages by integer or fractional amounts, depending on the circuit topology.

A voltage regulator may be controlled by (or at least a portion thereof may be included in) a power management integrated circuit (power management IC or PMIC). A PMIC may be used for managing the power requirement of a host system and may be used in battery-operated devices, such as mobile phones, tablets, laptops, wearables, etc., to control the flow and direction of electrical power in the devices. The PMIC may perform a variety of functions for the device such as DC-to-DC conversion (e.g., using a voltage regulator as described above), battery charging, power-source selection, voltage scaling, power sequencing, etc.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide the advantages described herein.

Certain aspects of the present disclosure provide a power supply circuit. The power supply circuit generally includes a switched-mode power supply (SMPS) circuit and a charge pump. The SMPS circuit has having a first input voltage node and a second input voltage node. The charge pump generally includes a first capacitive element having a first terminal and a second terminal, a first switch coupled between a first input node of the charge pump and the first terminal of the first capacitive element; a second switch coupled between the second terminal of the first capacitive element and a second input node of the charge pump; a third switch coupled between the first terminal of the first capacitive element and the first input voltage node of the SMPS circuit; and a fourth switch coupled between the second terminal of the first capacitive element and the second input voltage node of the SMPS circuit.

Certain aspects of the present disclosure provide a method of supplying power. The method generally includes operating a power supply circuit in a first phase and operating the power supply circuit in a second phase, different from the first phase. The power supply circuit generally includes a charge pump and an SMPS having a first input voltage node and a second input voltage node. The charge pump includes a capacitive element having a first terminal and a second terminal; a first switch coupled between a first input node of the charge pump and the first terminal of the capacitive element; a second switch coupled between the second terminal of the capacitive element and a second input node of the charge pump; a third switch coupled between the first terminal of the capacitive element and the first input voltage node of the SMPS circuit; and a fourth switch coupled between the second terminal of the capacitive element and the second input voltage node of the SMPS circuit.

Certain aspects of the present disclosure are directed to a power supply circuit. The power supply circuit includes a SMPS circuit and a charge pump. The SMPS generally includes a first transistor; a second transistor coupled to the first transistor via a first node; a third transistor coupled to the second transistor via a second node; a fourth transistor coupled to the third transistor via a third node; a first capacitive element having a first terminal coupled to the first node; a first driver having an output coupled to a control input of the first transistor; a second driver having an output coupled to a control input of the second transistor; a third driver having an output coupled to a control input of the third transistor; and a fourth driver having an output coupled to a control input of the fourth transistor. The charge pump is coupled to at least one of the first, second, third, or fourth driver.

Certain aspects of the present disclosure provide a power management integrated circuit (PMIC) comprising at least a portion of the power supply circuit described herein.

Certain aspects of the present disclosure provide a battery charging circuit comprising the power supply circuit described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 2B is an example timing diagram for the power supply circuit of FIG. 2A, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
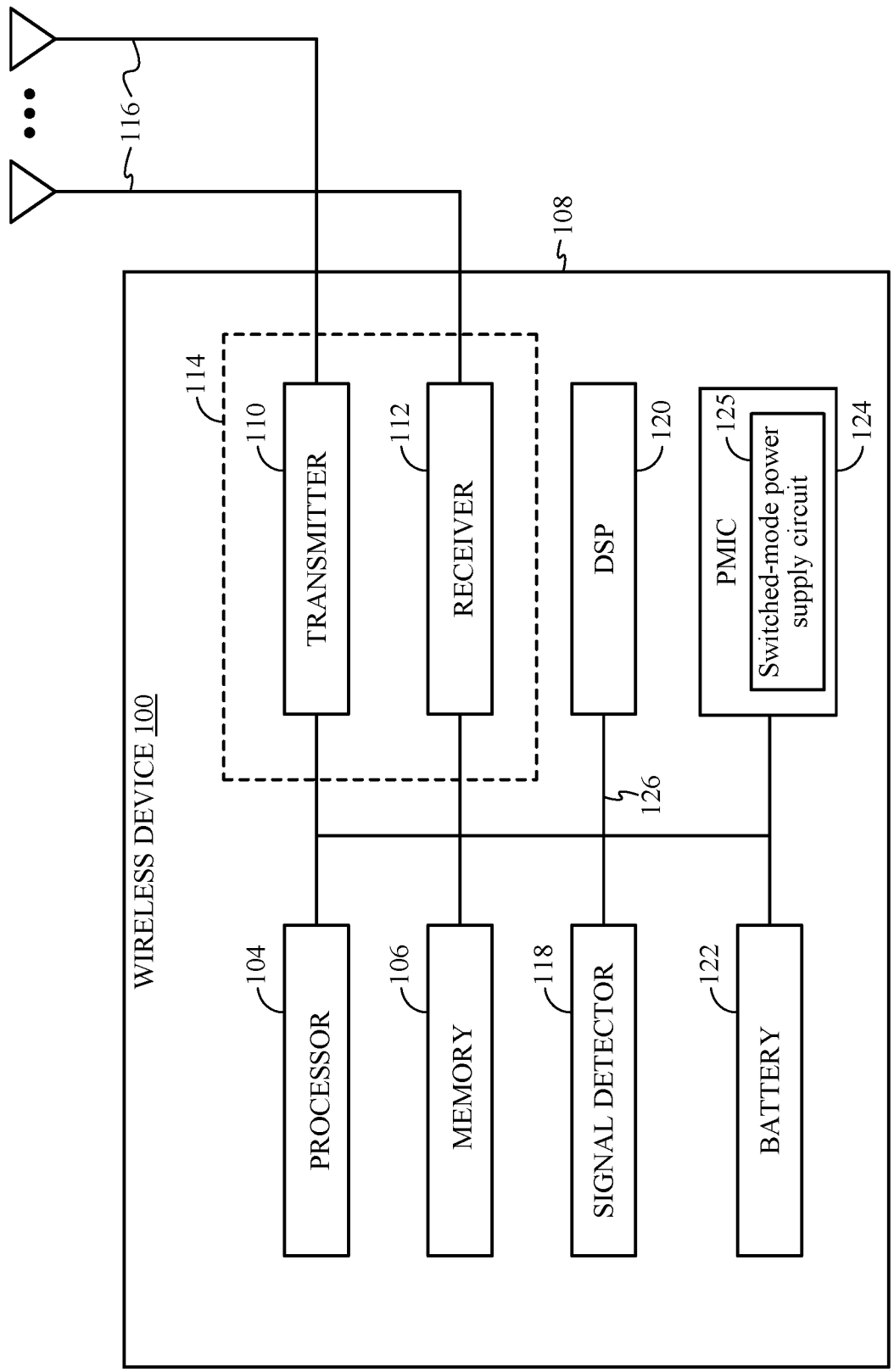
FIG. 1 illustrates a block diagram of an example device that includes a switched-mode power supply (SMPS) circuit, in accordance with certain aspects of the present disclosure.

Certain aspects of the present disclosure provide techniques and apparatus for supplying power to gate drivers of a switched-mode power supply (SMPS), such as a three-level buck converter, a divide-by-two (Div2) charge pump, or an adaptive combination power supply circuit capable of switching therebetween. The gate driver architecture described herein provides constant gate-to-source voltage ($V_{Gs}$) driving capability, among other advantages.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Device

It should be understood that aspects of the present disclosure may be used in a variety of applications. Although the present disclosure is not limited in this respect, the circuits disclosed herein may be used in any of various suitable apparatus, such as in the power supply, battery charging circuit, or power management circuit of a communication system, a video codec, audio equipment such as music players and microphones, a television, camera equipment, and test equipment such as an oscilloscope. Communication systems intended to be included within the scope of the present disclosure include, by way of example only, cellular radiotelephone communication systems, satellite communication systems, two-way radio communication systems, one-way pagers, two-way pagers, personal communication systems (PCSs), personal digital assistants (PDAs), and the like.

FIG. 1 illustrates an example device 100 in which aspects of the present disclosure may be implemented. The device 100 may be a battery-operated device such as a cellular phone, a PDA, a handheld device, a wireless device, a laptop computer, a tablet, a smartphone, a wearable device, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise coupled to the housing 108 and electrically connected to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122 used to power the various components of the device 100. The device 100 may also include a power management integrated circuit (power management IC or PMIC) 124 for managing the power from the battery to the various components of the device 100. The PMIC 124 may perform a variety of functions for the device such as DC-to-DC conversion, battery charging, power-source selection, voltage scaling, power sequencing, etc. In certain aspects, the PMIC 124 may include at least a portion of a power supply circuit, which may include a switched-mode power supply circuit 125. The switched-mode power supply circuit 125 may be implemented by any of various suitable switched-mode power supply circuit topologies, such as a three-level buck converter, a divide-by-two (Div2) charge pump, or an adaptive combination power supply circuit (e.g., the power supply circuit 200 of FIG. 2A), which can switch between operating as a three-level buck converter and a Div2 charge pump. For certain aspects, the PMIC 124 may include a battery charging circuit (e.g., a master-slave battery charging circuit). For certain aspects, the power supply circuit may include a driver architecture with a charge pump, as described below.

The various components of the device 100 may be coupled together by a bus system 126, which may include a power bus, a control signal bus, and/or a status signal bus in addition to a data bus.

Example Power Supply Circuit and Driver Architecture

In order to charge the battery (e.g., battery 122) in a portable device (e.g., a smartphone, tablet, and the like), a battery charging circuit may be utilized. For certain aspects, the battery charging circuit, or at least a portion thereof, may reside in a PMIC (e.g., PMIC 124) in the device. The battery charging circuit may comprise, for example, one or more switched-mode power supplies (e.g., circuit 125, such as a buck converter and/or a charge pump converter). For certain aspects, the battery charging circuit may comprise two or more parallel charging circuits, each capable of charging the battery, which may be connected together and to the battery in an effort to provide fast charging of the battery. The parallel charging circuits may be configured so that these circuits do not adversely interfere with each other during battery charging (e.g., in a master-slave relationship). Charging circuits for a parallel charger may use buck converter topologies, such as a three-level buck converter topology. However, one or more of the buck converters may be replaced with a charge pump converter in some parallel charging circuits.

Figure 2A:
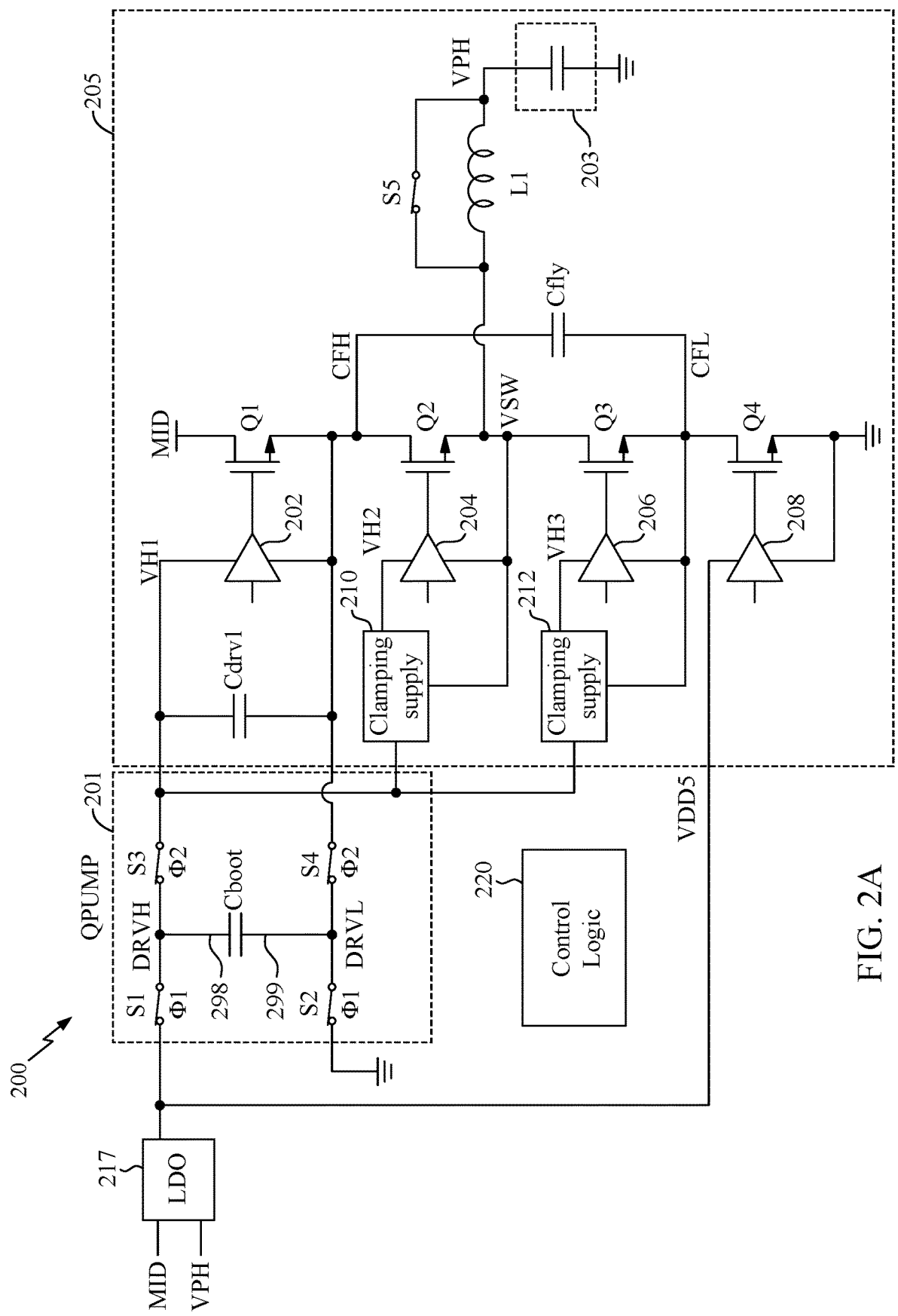
FIG. 2A is a circuit diagram of an example power supply circuit comprising a SMPS circuit and a charge pump for providing power to at least some of the drivers in the SMPS circuit, in accordance with certain aspects of the present disclosure.

FIG. 2A is a circuit diagram of an example power supply circuit 200, in accordance with certain aspects of the present disclosure. The power supply circuit 200 includes an SMPS circuit 205 and a charge pump 201 (e.g., labeled "QPUMP") for providing power to at least some of the gate drivers (e.g., drivers 202, 204, 206, 208) in the SMPS circuit. As illustrated in FIG. 2A, the SMPS circuit 205 may be reconfigurable between a three-level buck converter and a Div2 charge pump, as described below. For other aspects, the SMPS circuit 205 may be implemented by a buck converter (e.g., a three-level buck converter), a charge pump converter (e.g., a Div2 charge pump), a boost converter, a buck-boost converter, or any other suitable SMPS circuit.

To implement a three-level buck converter topology, the SMPS circuit 205 may include a first transistor Q1, a second transistor Q2, a third transistor Q3, a fourth transistor Q4, a flying capacitive element Cfly, an inductive element L1, and a load 203, which is represented in FIG. 2A by a capacitor. An adaptive combination power supply circuit may be realized by adding a switch S5 across the inductive element L1 of the three-level buck converter topology.

Transistor Q2 may be coupled to transistor Q1 via a first node (labeled "CFH" for flying capacitor high node), transistor Q3 may be coupled to transistor Q2 via a second node (labeled "VSW" for voltage switching node), and transistor Q4 may be coupled to transistor Q3 via a third node (labeled "CFL" for flying capacitor low node). For certain aspects, the transistors Q1-Q4 may be implemented as n-type metal-oxide-semiconductor (NMOS) transistors, as illustrated in FIG. 2A. In this case, the drain of transistor Q2 may be coupled to the source of transistor Q1, the drain of transistor Q3 may be coupled to the source of transistor Q2, and the drain of transistor Q4 may be coupled to the source of transistor Q3. The source of transistor Q4 may be coupled to a reference potential node (e.g., electric ground) for the power supply circuit 200. The flying capacitive element Cfly may have a first terminal coupled to the first node and a second terminal coupled to the third node. The inductive element L1 may have a first terminal coupled to the second node and a second terminal coupled to an output voltage node (labeled "VPH") and the load 203.

Control logic 220 may control operation of the power supply circuit 200. For example, control logic 220 may control operation of the transistors Q1-Q4 via output signals to the inputs of respective gate drivers 202, 204, 206, and 208. The outputs of the gate drivers 202, 204, 206, and 208 are coupled to respective gates of transistors Q1-Q4. During operation of the power supply circuit 200, the control logic 220 may cycle through four different phases, which may differ depending on whether the duty cycle is less than 50% or greater than 50%.

Operation of the power supply circuit 200 with a duty cycle of less than 50% is described first. In a first phase (referred to as a "charging phase"), transistors Q1 and Q3 are activated, and transistors Q2 and Q4 are deactivated, to charge the flying capacitive element Cfly and to energize the inductive element L1. In a second phase (called a "holding phase"), transistor Q1 is deactivated, and transistor Q4 is activated, such that the VSW node is coupled to the reference potential node, the flying capacitive element Cfly is disconnected (e.g., one of the Cfly terminals is floating), and the inductive element L1 is deenergized. In a third phase (referred to as a "discharging phase"), transistors Q2 and Q4 are activated, and transistor Q3 is deactivated, to discharge the flying capacitive element Cfly and to energize the inductive element L1. In a fourth phase (also referred to as a "holding phase"), transistor Q3 is activated, and transistor Q2 is deactivated, such that the flying capacitive element Cfly is disconnected and the inductive element L1 is deenergized.

Operation of the power supply circuit 200 with a duty cycle greater than 50% is similar in the first and third phases, with the same transistor configurations. However, in the second phase (called a "holding phase") following the first phase, transistor Q3 is deactivated, and transistor Q2 is activated, such that the VSW node is coupled to an input voltage node (labeled "MID"), the flying capacitive element Cfly is disconnected, and the inductive element L1 is energized. Similarly in the fourth phase (also referred to as a "holding phase"), transistor Q1 is activated, and transistor Q4 is deactivated, such that the flying capacitive element Cfly is disconnected and the inductive element L1 is energized.

Furthermore, the control logic 220 has a control signal (not shown) configured to control operation of switch S5 and selectively enable divide-by-two (Div2) charge pump operation. For certain aspects, when this control signal is logic low, switch S5 is open, and the power supply circuit 200 operates as a three-level buck converter using the inductive element L1. When this control signal is logic high, switch S5 is closed, thereby shorting across the inductive element L1 and effectively removing the inductive element L1 from the circuit, such that the power supply circuit 200 operates as a Div2 charge pump. The control logic 220 may be configured to automatically control operation of switch S5 (e.g., through the logic level of the control signal) based on at least one of an input voltage (e.g., the voltage at the MID node) or an operation mode, for the power supply circuit 200.

As described above, the SMPS circuit 205 may be reconfigurable between a three-level buck converter and a divide-by-two (Div2) charge pump. In such circuits, the driving of the gate-to-source voltage ($V_{Gs}$) of the power field-effect transistors (FETs) may be varied with the input voltage due to the architecture, which may limit the power efficiency performance and, thus, the applications for such circuits. For example, the input voltage range may be limited to a certain range around 7 V to 11 V because of the drivers for Q2 and Q3 in the three-level buck converter. However, in some charger solutions, the system application may demand a higher input voltage range, such as a 22 V wireless input voltage. Furthermore, the power efficiency of some charger solutions may be reduced at low input voltages since the $V_{Gs}$ driving may vary with the input voltage. Still further, some power supply circuit architectures cannot support three-level buck converter mode and USB on-the go (OTG) mode because the input voltage cannot support levels as low as 5 V, for example. It may be desirable for the driver architecture to support the three different conditions (three-level buck/Div2 charge pump/OTG).

As illustrated in FIG. 2A, the driver architecture for providing power to the four different drivers 202, 204, 206, 208 in the SMPS circuit 205 may include a charge pump 201 with at least one capacitive element (e.g., represented by a single capacitor (referred to as "Cboot") as shown) and two sets of switches (e.g., a first set with switches S1 and S2 and a second set with switches S3 and S4). Switch S1 is coupled between a first input node (labeled "VDD5") of the charge pump and a first terminal 298 of capacitor Cboot, and switch S2 is coupled between a second terminal 299 of capacitor Cboot and a second input node (e.g., a reference potential node for the power supply circuit 200, such as electrical ground). Switch S3 is coupled between the first terminal 298 of capacitor Cboot and a first input voltage node (labeled "VH1") of the SMPS circuit 205, and switch S4 is coupled between the second terminal 299 of capacitor Cboot and second input voltage node (labeled "CFH") of the SMPS circuit. The first and second input voltage nodes of the SMPS circuit 205 may be coupled to first and second power terminals, respectively, of the driver 202, across which may be coupled a capacitor Cdrvl, as illustrated.

The driver architecture may also include a voltage regulator 217 for providing a regulated voltage to the charge pump and/or to one or more of the drivers from one or more input voltages. The voltage regulator 217 may be implemented by any of various suitable voltage regulators, such as a low-dropout (LDO) regulator, as illustrated in FIG. 2A.

For certain aspects, the driver architecture may also include one or more clamping supplies 210 and 212 (e.g., floating supplies with a voltage clamping function), as depicted. The clamping supplies 210 and 212 provide voltages VH2 and VH3 from voltage VH1, with clamping at a particular voltage level (e.g., 5V clamping).

With this driver architecture, the charge pump 201 provides the power supply voltages for the Q1, Q2, and Q3 drivers (e.g., the drivers 202, 204, 206, respectively). For example, the charge pump 201 generates the VH1 voltage, which is the Q1 driver supply (i.e., the driver power supply for driver 202, configured to drive transistor Q1). The Q2 and Q3 driver supplies VH2 and VH3 are generated by the clamping supplies 210 and 212, respectively, from the VH1 voltage. The Q4 driver (e.g., the driver 208) may receive power from the output of the voltage regulator 217 (or the input voltage for the QPUMP), as illustrated in FIG. 2A. For certain aspects, the voltage regulator 217 (and the QPUMP power source) may be implemented by a linear voltage regulator (e.g., an LDO), which may be designed to select between multiple input power sources (e.g., between input voltage MID and output voltage VPH).

FIG. 2B is an example timing diagram 250 for the power supply circuit 200 of FIG. 2A, in accordance with certain aspects of the present disclosure. The timing diagram 250 illustrates the various transistor gate-to-source voltages (Q1 VGS, Q2 VGS, Q3 VGS, and Q4 VGS) and the charge pump phase signals ($\Phi1$ and $\Phi2$) with respect to a clock signal (CLK) while operating the power supply circuit 200 in a switching mode. As illustrated, when any of the transistors Q1-Q4 is turned on (e.g., at time 252, 256, or 258), the power supply circuit 200 changes to phase 2 (e.g., the $\Phi2$ switches S3 and S4 are closed, and the $\Phi1$ switches S1 and S2 are opened) for a brief moment (e.g., 100 ns). At the ends of the short periods during which the power supply circuit 200 is operating in $\Phi2$ (e.g., at time 254), the charge pump 201 returns to operation in phase 1. Thus, Cboot may be used to provide relatively constant power any time the transistors are turned on or off. Further, when the power supply circuit 200 switches back to $\Phi1$, the capacitor Cboot gets recharged.

Figure 3:
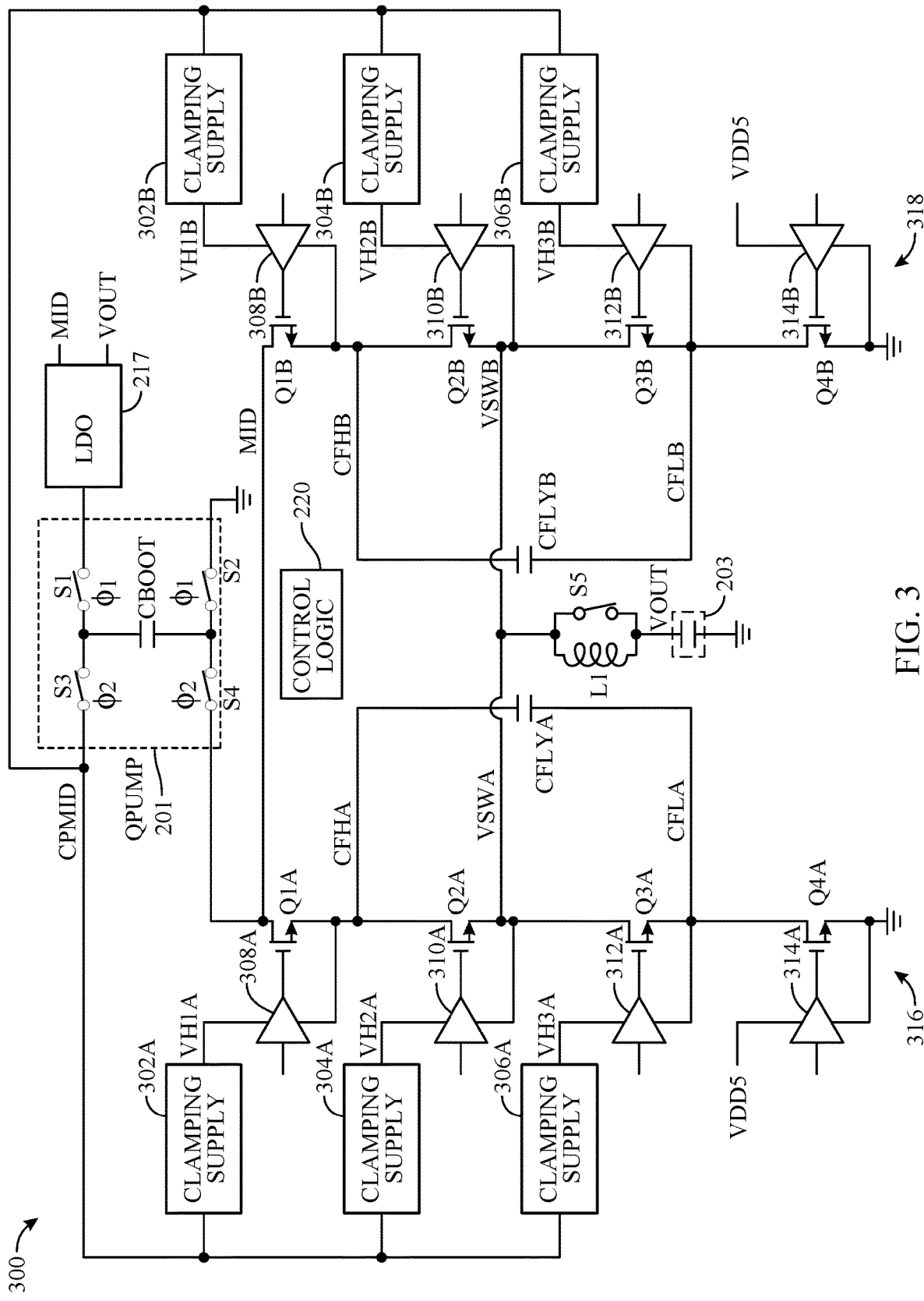
FIG. 3 is a circuit diagram of an example dual-phase SMPS circuit, in accordance with certain aspects of the present disclosure.

For certain aspects, the power supply circuit may be implemented with a multi-phase SMPS circuit as an alternative to a single-phase SMPS circuit (e.g., SMPS circuit 205). For example, FIG. 3 is a circuit diagram of an example power supply circuit 300 with a dual-phase three-level buck converter and a single charge pump (e.g., the charge pump 201), in accordance with certain aspects of the present disclosure. As illustrated in FIG. 3, the power supply circuit 300 also includes the optional voltage regulator 217, switches S1, S2, S3, S4, and S5, and control logic 220. Thus, the driver architecture described herein can leverage a single charge pump to support a multi-phase power supply circuit topology, that may minimize (or at least reduce) the cost and die area compared to certain other multi-phase implementations.

As shown, the power supply circuit 300 may include (e.g., similar to the power supply circuit 200 of FIG. 2A) first transistors Q1A and Q1B, second transistors Q2A and Q2B, third transistors Q3A and Q3B, fourth transistors Q4A and Q4B, flying capacitive elements CflyA and CflyB, an inductive element L1, and a load 203, which is represented here by a capacitor. A multi-phase adaptive combination power supply circuit may be realized by adding a switch S5 across the inductive element L1 of the power supply circuit 300. As shown, the components corresponding to one another (e.g., the transistors Q1A and Q1B) in each branch (or phase) of the power supply circuit 300 may be coupled in similar fashions. That is, components in the "A" branch 316 may be coupled to similar corresponding components as the components on the "B" branch 318 of the power supply circuit 300.

For example, transistor Q2A may be coupled to transistor Q1A via a first node (labeled "CFHA" for flying capacitor high node of branch A), transistor Q3A may be coupled to transistor Q2A via a second node (labeled "VSWA" for voltage switching node of branch A), and transistor Q4A may be coupled to transistor Q3A via a third node (labeled "CFLA" for flying capacitor low node of branch A). For certain aspects, the transistors Q1A-Q4A may be implemented as NMOS transistors, as illustrated. In this case, the drain of transistor Q2A may be coupled to the source of transistor Q1A, the drain of transistor Q3A may be coupled to the source of transistor Q2A, and the drain of transistor Q4A may be coupled to the source of transistor Q3A. The source of transistor Q4A may be coupled to a reference potential node (e.g., electric ground) for the power supply circuit 300. The flying capacitive element CflyA may have a first terminal coupled to the first node (CFHA) and a second terminal coupled to the third node (CFLA). The inductive element L1 may have a first terminal coupled to the second node (VSWA) and a second terminal coupled to an output voltage node (labeled "VOUT") and the load 203.

In a similar fashion, transistor Q2B may be coupled to transistor Q1B via a fourth node (labeled "CFHB" for flying capacitor high node of branch B), transistor Q3B may be coupled to transistor Q2B via a fifth node (labeled "VSWB" for voltage switching node of branch B), and transistor Q4B may be coupled to transistor Q3B via a sixth node (labeled "CFLB" for flying capacitor low node of branch B). For certain aspects, the transistors Q1B-Q4B may be implemented as NMOS transistors, as illustrated. In this case, the drain of transistor Q2B may be coupled to the source of transistor Q1B, the drain of transistor Q3B may be coupled to the source of transistor Q2B, and the drain of transistor Q4B may be coupled to the source of transistor Q3B. The source of transistor Q4B may be coupled to a reference potential node (e.g., electric ground) for the power supply circuit 300. The flying capacitive element CflyB may have a first terminal coupled to the fourth node (CFHB) and a second terminal coupled to the sixth node (CFLB). The first terminal of the inductive element L1 may also be coupled to the fifth node (VSWB).

Control logic 220 may control operation of the power supply circuit 300. For example, control logic 220 may control operation of the transistors Q1A, Q1B, Q2A, Q2B, Q3A, Q3B, Q4A, and Q4B via output signals to the inputs of respective gate drivers 308A, 308B, 310A, 310B, 312A, 312B, 314A, and 314B. In other words, the outputs of the gate drivers 308A, 310A, 312A, and 314A are coupled to respective gates of transistors Q1A-Q4A, while the outputs of the gate drivers 308B, 310B, 312B, and 314B are coupled to respective gates of transistors Q1B-Q4B. Similar to the power supply circuit 200 of FIG. 2A, and as described above, during operation of the power supply circuit 300, the control logic 220 may cycle through four different phases, which may differ depending on whether the duty cycle is less than 50% or greater than 50%.

As illustrated in FIG. 3, the driver architecture for providing power to the four different drivers 308A, 310A, 312A, and 314A of the "A" branch 316, and the four different drivers 308B, 310B, 312B, and 314B on the "B" branch 318 in the multi-phase SMPS circuit may include a charge pump (labeled "QPUMP") with at least one capacitive element (e.g., represented by a single capacitor (referred to as "Cboot") as shown) and two sets of switches (e.g., a first set with switches S1 and S2 and a second set with switches S3 and S4). Switch S1 is coupled between the voltage regulator 217 and a first terminal of capacitor Cboot, and switch S2 is coupled between a second terminal of capacitor Cboot and a second input node (e.g., a reference potential node for the power supply circuit 300, such as electrical ground). Switch S3 is coupled between the first terminal of capacitor Cboot and a first input voltage node (labeled "CPMID") of the SMPS circuit, and switch S4 is coupled between the second terminal of capacitor Cboot and a second input voltage node (labeled "MID") of the SMPS circuit. The first input voltage node of the SMPS circuit may be coupled to the input(s) of one or more clamping supplies 302A, 302B, 304A, 304B, 306A, and 306B, as shown. The clamping supplies 302A, 302B, 304A, 304B, 306A, and 306B may be floating supplies with a voltage clamping function, as depicted. The clamping supplies 302A, 302B, 304A, 304B, 306A, and 306B provide voltages VH1A, VH1B, VH2A, VH2B, VH3A, and VH3B, respectively, from voltage CPMID, with clamping at a particular voltage level (e.g., 5V clamping).

The driver architecture described herein has constant $V_{GS}$ driving capability, along with several other advantages. First, the power supply circuit with the driver architecture described herein supports wide input voltage range operation. For example, the power supply circuit described herein can operate from 5 V input to above 20 V input with constant $V_{GS}$ driving. Second, the power supply circuit with the driver architecture described herein may ensure the on-resistance ($R_{ds,on}$) of the power FETs (e.g., transistors Q1-Q4 of FIG. 2A) has no input dependency. In other words, the on-resistance of the power FETS is not dependent on the input voltage (e.g., MID or VPH) for the power supply circuit. This may offer increased power efficiency across the wide input voltage range, especially in a heavy load condition. Third, the power supply circuit with the driver architecture described herein may provide for a combined three-level buck converter, divide-by-two (Div2) charge pump, and on-the-go (OTG) architecture. Fourth, the driver architecture described herein may include a single external capacitor, which may minimize (or at least reduce) the cost and/or the number of input/output (I/O) pads. Fifth, the driver architecture described herein may provide for enhanced efficiency through the capability of switching between different driving current sources. For example, the driver current may be switchable from either the input side (e.g., MID) or the output side (e.g., VPH). Sixth, the driver architecture described herein may provide for sharing a single charge pump to support a multi-phase SMPS topology, which may minimize (or at least reduce) the cost and the layout area.

Example Operations for Supplying Power

Figure 4:
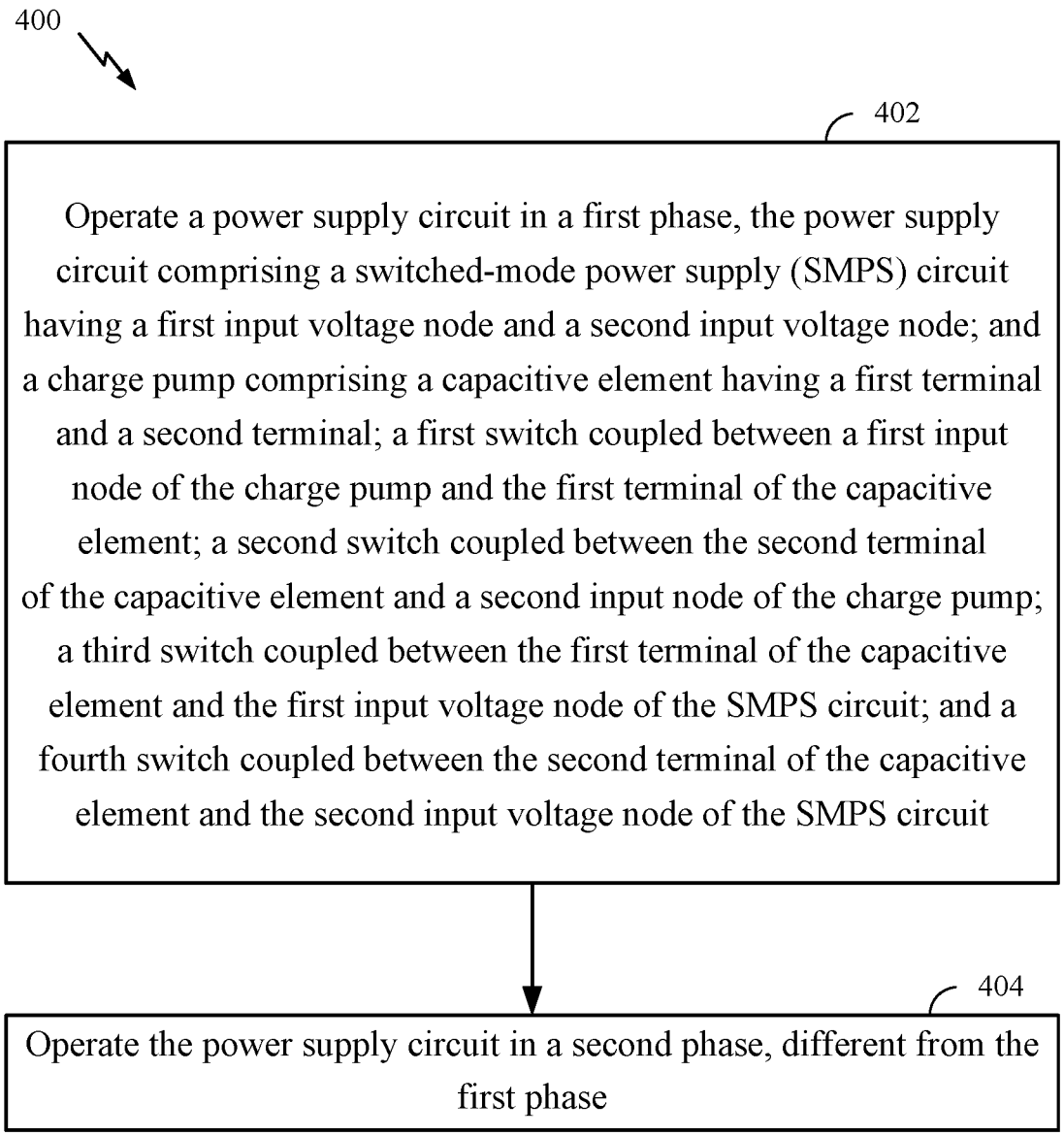
FIG. 4 is a flow diagram of example operations for supplying power, in accordance with certain aspects of the present disclosure.

FIG. 4 illustrates example operations 400 that may be performed by a power supply circuit (e.g., the power supply circuit 200), in accordance with certain aspects of the present disclosure.

The operations 400 may begin, at block 402, by operating a power supply circuit in a first phase (e.g., Φ1). The power supply circuit generally includes a SMPS circuit (e.g., SMPS circuit 205) having a first input voltage node (e.g., VH1) and a second input voltage node (e.g., CFH), and a charge pump (e.g., the charge pump 201). The charge pump generally includes a capacitive element (e.g., Cboot) having a first terminal (e.g., first terminal 298) and a second terminal (e.g., second terminal 299), a first switch (e.g., switch S1) coupled between a first input node (e.g., VDD5) of the charge pump and the first terminal of the capacitive element; a second switch (e.g., switch S2) coupled between the second terminal of the capacitive element and a second input node (e.g., the reference potential node) of the charge pump; a third switch (e.g., switch S3) coupled between the first terminal of the capacitive element and the first input voltage node of the SMPS circuit; and a fourth switch (e.g., switch S4) coupled between the second terminal of the capacitive element and the second input voltage node of the SMPS circuit.

At block 404 the power supply circuit operates in a second phase (e.g., Φ2), different from the first phase.

In certain aspects, operating the power supply circuit in the first phase at block 402 involves opening the third and fourth switches of the charge pump and closing the first and second switches of the charge pump. In this case, operating the power supply circuit in the second phase may entail opening the first and second switches of the charge pump and closing the third and fourth switches of the charge pump.

In some cases, the power supply circuit may further include a voltage regulator (e.g., the voltage regulator 217) having a first input coupled to a third input voltage node (e.g., MID) of the SMPS circuit, a second input coupled to an output voltage node of the SMPS circuit, and an output coupled to the first input node of the charge pump. In this case, the operations 400 may further entail selecting between the first input and the second input for supplying current to drive the SMPS circuit.

According to certain aspects, the SMPS circuit includes at least one transistor (e.g., transistor Q2). In this case, operating the power supply circuit in the second phase at block 404 comprises driving a gate of the at least one transistor with a driver (e.g., gate driver 204). In certain aspects, operating the supply circuit in the second phase further entails clamping a voltage at the first input voltage node of the SMPS circuit and powering the driver with the clamped voltage. In this case, clamping the voltage may involve clamping the voltage with a clamping supply (e.g., clamping supply 210) having an input coupled to the first input voltage node of the SMPS circuit and to the third switch of the charge pump, having a first output coupled to a first power terminal (e.g., VH2) of the driver, and a second output coupled to a second power terminal (e.g., VSW) of the driver.

In some cases, the operations 400 further entail changing a configuration of the SMPS circuit from a three-level buck converter to a divide-by-two charge pump.

Certain aspects of the present disclosure provide a power supply circuit (e.g., the power supply circuit 200). The power supply circuit generally includes a SMPS circuit having a first input voltage node (e.g., VH1) and a second input voltage node (e.g., CFH), and a charge pump (e.g., the charge pump 201). The charge pump generally includes a first capacitive element (e.g., Cboot) having a first terminal (e.g., first terminal 298) and a second terminal (e.g., second terminal 299), a first switch (e.g., switch S1) coupled between a first input node (e.g., VDD5) of the charge pump and the first terminal of the first capacitive element; a second switch (e.g., switch S2) coupled between the second terminal of the first capacitive element and a second input node (e.g., the reference potential node) of the charge pump; a third switch (e.g., switch S3) coupled between the first terminal of the first capacitive element and the first input voltage node of the SMPS circuit; and a fourth switch (e.g., switch S4) coupled between the second terminal of the first capacitive element and the second input voltage node of the SMPS circuit.

According to certain aspects, in a first phase (e.g., Φ1), the first and second switches are configured to be closed, and the third and fourth switches are configured to be open. In this case, in a second phase (e.g., Φ2), the third and fourth switches may be configured to be closed, and the first and second switches may be configured to be open.

According to certain aspects, the power supply circuit further includes a voltage regulator (e.g., the voltage regulator 217) having a first input coupled to a third input voltage node (e.g., MID) of the SMPS circuit and having an output coupled to the first input node of the charge pump. For certain aspects, the voltage regulator has a second input coupled to an output voltage node (e.g., VPH) of the SMPS circuit. In this case, the voltage regulator may be configured to select between the first input and the second input for supplying current to drive the SMPS circuit.

According to certain aspects, the SMPS circuit comprises a first transistor (e.g., Q1); a second transistor (e.g., Q2) coupled to the first transistor via a first node (e.g., CFH); a third transistor (e.g., Q3) coupled to the second transistor via a second node (e.g., VSW); a fourth transistor (e.g., Q4) coupled to the third transistor via a third node (e.g., CFL); a second capacitive element (e.g., flying capacitive element Cfly) having a first terminal coupled to the first node and a second terminal coupled to the third node; an inductive element (e.g., inductive element L1) having a first terminal coupled to the second node and a second terminal coupled to an output voltage node of the SMPS circuit. For certain aspects, the SMPS circuit further includes a fifth switch (e.g., switch S5) having a first terminal coupled to the first terminal of the inductive element and having a second terminal coupled to the second terminal of the inductive element. In this case, the SMPS circuit may be configured as a 3-level buck converter when the fifth switch is open, whereas the SMPS circuit may be configured as a divide-by-two charge pump when the fifth switch is closed. For certain aspects, a drain of the second transistor is coupled to a source of the first transistor, a drain of the third transistor is coupled to a source of the second transistor, and a drain of the fourth transistor is coupled to a source of the third transistor. In this case, a drain of the first transistor may be coupled to a third input voltage node (e.g., MID) of the SMPS circuit; the first node of the SMPS circuit may be coupled to the second input voltage node; and a source of the fourth transistor may be coupled to a reference potential node of the SMPS circuit. For certain aspects, the SMPS circuit further includes a first driver (e.g., driver 202) having an output coupled to a gate of the first transistor, a second driver (e.g., driver 204) having an output coupled to a gate of the second transistor, a third driver (e.g., driver 206) having an output coupled to a gate of the third transistor, and a fourth driver (e.g., driver 208) having an output coupled to a gate of the fourth transistor. In this case, the first driver may have a first power terminal coupled to the first input voltage node of the SMPS circuit and the third switch of the charge pump, and/or the first driver may have a second power terminal coupled to the third input voltage node of the SMPS circuit and the fourth switch of the charge pump. For certain aspects, the power supply circuit further includes a first clamping supply having an input coupled to the first input voltage node of the SMPS circuit and to the third switch of the charge pump, a first output (e.g., VH2) coupled to a first power terminal of the second driver, and a second output coupled to a second power terminal of the second driver and to the second node of the SMPS circuit. In this case, the power supply circuit may further include a second clamping supply having an input coupled to the first input voltage node of the SMPS circuit and to the third switch of the charge pump, a first output (e.g., VH3) coupled to a first power terminal of the third driver, and a second output coupled to a second power terminal of the third driver and to the third node of the SMPS circuit. For certain aspects, the fourth driver has a first power terminal (e.g., VDD5) coupled to the input node of the charge pump and to the first switch of the charge pump. In this case, the fourth driver may have a second power terminal coupled to the reference potential node and to a source of the fourth transistor.

According to certain aspects, the SMPS circuit comprises a three-level buck converter.

According to certain aspects, the SMPS circuit comprises a multi-phase buck converter (e.g., as illustrated in FIG. 3).

Certain aspects of the present disclosure provide a power management integrated circuit (PMIC) comprising at least a portion of the power supply circuit described above.

Certain aspects of the present disclosure provide a battery charging circuit comprising the power supply circuit described above.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of a list of" items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A power supply circuit comprising:
    a switched-mode power supply (SMPS) circuit having a first input voltage node and a second input voltage node; and
    a charge pump comprising:
        a first capacitive element having a first terminal and a second terminal;
        a first switch coupled between a first input node of the charge pump and the first terminal of the first capacitive element;
        a second switch coupled between the second terminal of the first capacitive element and a second input node of the charge pump;
        a third switch coupled between the first terminal of the first capacitive element and the first input voltage node of the SMPS circuit; and
        a fourth switch coupled between the second terminal of the first capacitive element and the second input voltage node of the SMPS circuit.

2. The power supply circuit of claim 1, wherein:
    in a first phase, the first and second switches are configured to be closed, and the third and fourth switches are configured to be open; and
    in a second phase, the third and fourth switches are configured to be closed, and the first and second switches are configured to be open.

3. The power supply circuit of claim 1, further comprising a voltage regulator having a first input coupled to a third input voltage node of the SMPS circuit and having an output coupled to the first input node of the charge pump.

4. The power supply circuit of claim 3, wherein:
    the voltage regulator has a second input coupled to an output voltage node of the SMPS circuit; and
    the voltage regulator is configured to select between the first input and the second input for supplying current to drive the SMPS circuit.

5. The power supply circuit of claim 1, wherein the SMPS circuit comprises:
    a first transistor;
    a second transistor coupled to the first transistor via a first node;
    a third transistor coupled to the second transistor via a second node;
    a fourth transistor coupled to the third transistor via a third node;
    a second capacitive element having a first terminal coupled to the first node and a second terminal coupled to the third node; and
    an inductive element having a first terminal coupled to the second node and a second terminal coupled to an output voltage node of the SMPS circuit.

6. The power supply circuit of claim 5, wherein the SMPS circuit further comprises a fifth switch having a first terminal coupled to the first terminal of the inductive element and having a second terminal coupled to the second terminal of the inductive element.

7. The power supply circuit of claim 5, wherein:
    a drain of the second transistor is coupled to a source of the first transistor;
    a drain of the third transistor is coupled to a source of the second transistor; and
    a drain of the fourth transistor is coupled to a source of the third transistor.

8. The power supply circuit of claim 7, wherein:
    a drain of the first transistor is coupled to a third input voltage node of the SMPS circuit;
    the first node of the SMPS circuit is coupled to the second input voltage node; and a source of the fourth transistor is coupled to a reference potential node of the SMPS circuit.

9. The power supply circuit of claim 5, wherein the SMPS circuit further comprises:
   a first driver having an output coupled to a gate of the first transistor;
   a second driver having an output coupled to a gate of the second transistor;
   a third driver having an output coupled to a gate of the third transistor; and
   a fourth driver having an output coupled to a gate of the fourth transistor.

10. The power supply circuit of claim 9, wherein:
    the first driver has a first power terminal coupled to the first input voltage node of the SMPS circuit and the third switch of the charge pump; and
    the first driver has a second power terminal coupled to the second input voltage node of the SMPS circuit and the fourth switch of the charge pump.

11. The power supply circuit of claim 9, further comprising a first clamping supply having an input coupled to the first input voltage node of the SMPS circuit and to the third switch of the charge pump, a first output coupled to a first power terminal of the second driver, and a second output coupled to a second power terminal of the second driver and to the second node of the SMPS circuit.

12. The power supply circuit of claim 11, further comprising a second clamping supply having an input coupled to the first input voltage node of the SMPS circuit and to the third switch of the charge pump, a first output coupled to a first power terminal of the third driver, and a second output coupled to a second power terminal of the third driver and to the third node of the SMPS circuit.

13. The power supply circuit of claim 9, wherein:
    the fourth driver has a first power terminal coupled to the first input node of the charge pump and to the first switch of the charge pump; and
    the fourth driver has a second power terminal coupled to a reference potential node of the SMPS circuit and to a source of the fourth transistor.

14. The power supply circuit of claim 1, wherein the second input node of the charge pump is coupled to a reference potential node.

15. The power supply circuit of claim 1, wherein the SMPS circuit comprises a three-level buck converter.

16. The power supply circuit of claim 1, wherein the SMPS circuit comprises a multi-phase buck converter.

17. A power management integrated circuit (PMIC) comprising at least a portion of the power supply circuit of claim 1.

18. A battery charging circuit comprising the power supply circuit of claim 1.

19. A method of supplying power, comprising:
    operating a power supply circuit in a first phase, the power supply circuit comprising:
      a switched-mode power supply (SMPS) circuit having a first input voltage node and a second input voltage node; and
      a charge pump comprising:
        a capacitive element having a first terminal and a second terminal;
        a first switch coupled between a first input node of the charge pump and the first terminal of the capacitive element;
        a second switch coupled between the second terminal of the capacitive element and a second input node of the charge pump;
        a third switch coupled between the first terminal of the capacitive element and the first input voltage node of the SMPS circuit; and
        a fourth switch coupled between the second terminal of the capacitive element and the second input voltage node of the SMPS circuit; and
    operating the power supply circuit in a second phase, different from the first phase.

20. The method of claim 19, wherein operating the power supply circuit in the first phase comprises:
    opening the third and fourth switches of the charge pump; and
    closing the first and second switches of the charge pump.

21. The method of claim 20, wherein operating the power supply circuit in the second phase comprises:
    opening the first and second switches of the charge pump; and
    closing the third and fourth switches of the charge pump.

22. The method of claim 19, wherein:
    the power supply circuit further comprises a voltage regulator having a first input coupled to a third input voltage node of the SMPS circuit, having a second input coupled to an output voltage node of the SMPS circuit, and having an output coupled to the first input node of the charge pump; and
    the method further comprises selecting between the first input and the second input for supplying current to drive the SMPS circuit.

23. The method of claim 19, wherein:
    the SMPS circuit comprises at least one transistor; and
    operating the power supply circuit in the second phase comprises:
      driving a gate of the at least one transistor with a driver;
      clamping a voltage at the first input voltage node of the SMPS circuit; and
      powering the driver with the clamped voltage.

24. The method of claim 23, wherein the clamping comprises clamping the voltage with a clamping supply having an input coupled to the first input voltage node of the SMPS circuit and to the third switch of the charge pump, having a first output coupled to a first power terminal of the driver, and a second output coupled to a second power terminal of the driver.

25. The method of claim 19, further comprising changing a configuration of the SMPS circuit from a three-level buck converter to a divide-by-two charge pump.

26. A power supply circuit comprising:
    a switched-mode power supply (SMPS) circuit comprising:
      a first transistor;
      a second transistor coupled to the first transistor via a first node;
      a third transistor coupled to the second transistor via a second node;
      a fourth transistor coupled to the third transistor via a third node;
      a first capacitive element having a first terminal coupled to the first node;
      a first driver having an output coupled to a control input of the first transistor;
      a second driver having an output coupled to a control input of the second transistor;
      a third driver having an output coupled to a control input of the third transistor; and
      a fourth driver having an output coupled to a control input of the fourth transistor; and a charge pump coupled to at least one of the first, second, third, or fourth driver.

27. The power supply circuit of claim 26, further comprising an inductive element having a first terminal coupled to the second node and a second terminal coupled to an output voltage node of the SMPS circuit.

28. The power supply circuit of claim 27, further comprising a switch coupled in parallel with the inductive element.

29. The power supply circuit of claim 26, further comprising a clamping supply having an input coupled to the charge pump, having a first output coupled to a first power terminal of the second driver or the third driver, and having a second output coupled to a second power terminal of the second driver or the third driver.

30. The power supply circuit of claim 26, wherein the charge pump comprises:
   a second capacitive element having a first terminal and a second terminal;
   a first switch coupled between a first input node of the charge pump and the first terminal of the second capacitive element;
   a second switch coupled between the second terminal of the second capacitive element and a second input node of the charge pump;
   a third switch coupled between the first terminal of the second capacitive element and the at least one of the first, second, third, or fourth driver; and
   a fourth switch coupled between the second terminal of the second capacitive element and the first node of the SMPS circuit.

* * * * *